Sept. 6, 1932.    R. H. CARSON    1,875,851
VALVE
Filed April 24, 1929
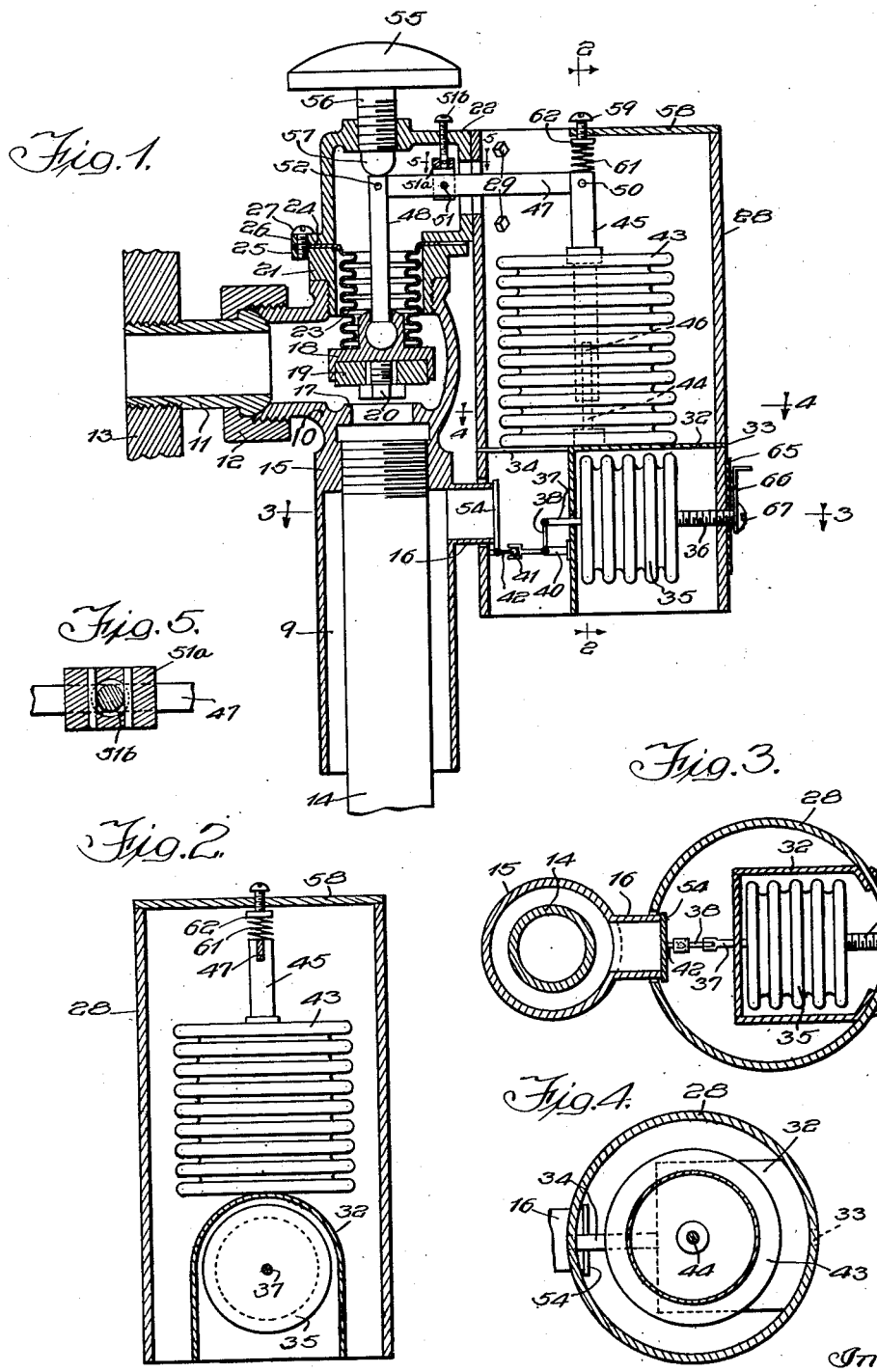
Witness:
William R. Kilroy
Inventor:
Robert H. Carson
By Hill & Hill
Att'ys Patented Sept. 6, 1932

1,875,851

UNITED STATES PATENT OFFICE

ROBERT H. CARSON, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

VALVE

Application filed April 24, 1929. Serial No. 357,796.

My invention relates to direct control valves and more particularly it relates to a direct control valve adapted for use with dryers and with steam or hot water radiators for heating dwellings, offices and the like.

The thermostatic control of the flow of heating fluid from a source of supply into radiators or dryers is old in the art, but in general it has been accomplished by a thermostat which operatively controls the flow of heating fluid in a pipe which supplies a number of different radiators separately positioned or in different rooms. Such control of the flow of fluid is influenced by the temperature at the point where the thermostat is located. Since it is improbable that temperatures in the various rooms being heated will be the same as the temperature of the point where the thermostat is located, such control frequently operates to shut off the heat in rooms prematurely or permits the heat to continue therein for a long period after the desired maximum temperature is reached. For this reason it is desired to have an individual control valve for each radiator unit which operates in accordance with the temperature of the particular room to be heated thereby shutting off the heat when the temperature reaches the desired maximum for that particular room and turning it on again when it falls below a predetermined minimum.

One of the objects of the invention is to provide direct control valves embodying improved means for opening and closing the valves in accordance with the temperature adjacent the valves.

Another object of my invention is the provision of an automatic temperature regulator which is adapted for individual radiator control in accordance with the temperature of a room in which the radiator is located, said regulator being adapted for attachment to the casing of the valve which opens and closes the individual fluid supply pipe leading to the radiator.

A further object is the production of improved means for regulating a device of the class described.

A further object is the production of a device of the character described which is compact, convenient, durable, and satisfactory for use wherever found applicable.

Still another object is the provision of an individual valve control which is completely self-regulated and requires no outside power for its operation and no structural changes for its installation.

A feature of the invention is the provision of a relatively small chamber surrounding the fluid supply pipe, the chamber being open at the bottom so that air contained therein is constantly at a high temperature by reason of its proximity to the supply pipe regardless of whether the radiator valve is open or closed. This superheated air is always available and is automatically released to close the radiator valve when the room temperature exceeds a predetermined maximum and is confined in the chamber when the room temperature falls below a predetermined minimum.

Still another object is the provision of improved means for changing the maximum and the minimum temperatures at which the control valve is opened and closed.

A still further object is the provision of improved construction adapted for both thermostatic and manual actuation of a valve of the class described.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing wherein like reference characters indicate like or corresponding parts:

Fig. 1 is a sectional elevation through the device;

Fig. 2 is a section taken along the line 2—2 of Fig. 1;

Fig. 3 is a section taken along the line 3—3 of Fig. 1;

Fig. 4 is a section taken along the line 4—4 of Fig. 1, and

Fig. 5 is a section taken along the line 5—5 of Fig. 1.

Referring to the drawing, the numeral 10 generally indicates a valve casing which is shown attached to a radiator unit 13 by means of a connector 11 and a union nut 12.

A supply pipe 14 connects the radiator unit 13 through the valve casing 10 with a source of steam or vapor (not shown). The supply pipe 14 is connected to the valve casing 10 by a connector 15 which has a downwardly extending cylindrical shaped projection through which the pipe 14 extends for a considerable distance. The space between the pipe 14 and the connector 15 provides a vertically extending chamber 9 which is open to the atmosphere at its lower end and is provided at its upper end with a by pass 16 for a purpose hereinafter more particularly described.

The flow of fluid through the pipe 14 is controlled by a valve 18 which is adapted to be either manually or automatically actuated to open and closed positions; the valve 18 comprises a valve disk 19 engageable with a valve seat 17. The valve disk 19 is fastened to the valve 18 by a nut 20. A cage or sleeve 21 is threaded into the upper portion of the valve casing 10 to provide a runway for a diaphragm 23 of the "sylphon" type. The diaphragm 23 is secured to the valve 18 at its lower end, and at its upper end is provided with a flange 24 which is clamped between the cage 21 and a cover 22. The cover 22 has an outturned flange 26 opposed to a similar flange 25 formed on the cage 21. The flange of the diaphragm 23 is clamped between the outstanding flanges of the cage 21 and the cover 22 by means of bolts 27. The lower end of the diaphragm 23 has a brazed or other suitably fluid tight joint with the valve 18.

A generally cylindrical casing 28 is fastened to the side walls of the cover 22 by a plurality of bolts 29. The casing 28 provides a housing for the control elements which automatically actuate the valve 18.

An auxiliary housing member 32 is positioned in the lower end of the casing 28 and provides a mounting for a relatively delicately adjusted diaphragm 35. The housing 32 has an extension 33 projecting through the wall of the casing 28 and a diametrical oppositely projecting stem 34 similarly mounted in the opposite side wall of the casing. The extension 33 and the stem 34 provide supports for the housing 32 and the diaphragm 35.

The diaphragm 35 is supported at its one end by a rod 36 which has a threaded engagement with the wall of the cylindrical casing 28 through which it projects. The opposite end of the diaphragm 35 is supported by a stem 37 which is slidably mounted in the end wall of the housing 32 and projects therethrough to engage a bell crank lever 38. The bell crank lever 38 is pivotally mounted at its mid portion upon a member 40 and has a pivoted connection at its upper end with the stem 37. The opposite free end of the lever 38 is bifurcated to receive a pin 41 which is mounted on the end of an arm 42. The arm 42 is rigidly connected to the lower end of a flap valve 54. The valve 54 is positioned to control the flow of air from the chamber 9 through the by pass 16.

A dial 65, mounted on the exterior of the casing 28 immediately above the projecting end of the rod 36, is suitably graduated for use in calibrating the diaphragm 35 and for subsequent adjustment of the apparatus. A pointer 66 is mounted on the end of the rod 36. The projecting end of the rod 36 has a screw head 67 formed thereon so that the rod may be rotated with a suitable tool to cause longitudinal displacement thereof. The inner end of the rod 36 has a swivelled connection (not shown) with the adjacent end of the diaphragm 35.

The diaphragm 35 is adjusted as described more fully hereinafter by rotating the rod 36 and by suitably setting the pointer 66 to determine a temperature above which the diaphragm 35 will expand and displace the lever 37 to cause the flap valve 54 to open. The purpose of the valve 54 is to control the flow of the highly heated air from the chamber 9 through the by pass 16 and upwardly and around a diaphragm 43. Similarly, contraction of the diaphragm 35 will operate to close the flap valve 54 at or below a predetermined minimum temperature. The diaphragm 35 contains any suitable volatile fluid which makes it susceptible to slight changes in temperature. The housing member 32 protects the delicately adjusted diaphragm 35 from contact with the heated air coming from the by pass 16.

The diaphragm 43 is supported upon the housing 32 and held in position by a pin 44. The pin 44 is fastened to the housing 32 and engages a post 45 which is mounted in the upper movable end of the diaphragm 43. The lower end of the post 45 contains a socket 46 in which the pin 44 is slidably journalled and thereby holds the relatively large diaphragm 43 in approximately a vertical position and likewise permits the post 45 to move with the free end of the diaphragm and still maintain engagement with the pin 44. The diaphragm 43 contains a volatile fluid the heating of which is accelerated and causes its rapid expansion when the hot air coming from the chamber 9 flows thereabout.

Expansion of the diaphragm 43 operates to seat the valve 18 and stop the flow of the heating fluid into the radiator unit. For this purpose the post 45 is provided with an upwardly projecting bifurcated end to which one end of a lever 47 is pivoted by a pin 50. The opposite end of the lever 47 has a pivotal connection with the upper end of a bifurcated vertical rod 48. The lever 47 is supported by, and pivoted upon, a pin 51 which is mounted in a bifurcated member 51a swivelled to the lower end of a screw 51b screw threaded into the top wall of the housing 22. It is obvious that as the free end of the diaphragm 43 moves upwardly it carries with it the post 45 and the adjacent end of the lever 47. The opposite end of the lever 47 is at the same time forced downwardly, carrying with it the vertical rod 48 and the valve 18. The lower end of the rod 48 has a ball and socket connection with the valve 18 thereby permitting the valve to move with the rod and at the same time to maintain a horizontal position parallel to the valve seat 17. The diaphragm 23 prevents leakage of steam or vapor from the valve housing.

The valve 18 may be manually actuated to open and closed position independently of the diaphragm 43; for this purpose I have provided a wheel 55 which is mounted on a stem 56, the stem 56 having a threaded connection with the upper wall of the cover 22. A boss 57 is mounted on the lower end of the stem 56 in position to contact with the upper end of the vertical rod 48. Threading of the stem 56 downwardly by turning the wheel 55 moves the valve 18 downwardly to its seated position. Opening of the valve 18 manually is accomplished by actuation of the valve wheel and stem in the opposite direction, the valve 18 being unseated and raised to its open position by a spring 61 which operates on the opposite end of the lever 47.

The upper end of the casing 28 is partially enclosed by a wall member 58 through which a screw 59 is threaded. A washer or plate member 62 has a swivelled connection with the lower end of the screw 59. The spring 61 is positioned between the open end of the post 45 and the washer 62, having its ends respectively connected to the post and the washer in any suitable manner. By threading screw 59 inwardly or outwardly the resistance of the spring 61 to the upward movement of the post 45 may be varied.

The device operates through a cycle beginning with valve 18 in open position and flap valve 54 in its vertical closed position. Flow of fluid into the radiator 13 elevates the temperature of the room to a point where the diaphragm 35 expands and permits the flap valve 54 to open. The hot air in the chamber 9 then flows out through the by pass 16, up and around the diaphragm 43 causing it to expand to a point where the valve 18 is closed and the flow of the heating fluid to the radiator is shut off. The resulting drop in temperature of the room will then cause the relatively delicately balanced diaphragm 35 to contract, thereby closing the flap valve 54 preventing the flow of heated air around the diaphragm 43.

The diaphragm 43 is so adjusted that at normal room temperatures it is contracted to the point where the valve 18 is opened. The closing of the flap valve 54 and the cessation of the flow of heated air from the chamber 9 causes the diaphragm 43 to contract and thereby again open the valve 18. By this means direct control of the valve 18 is accomplished through slight fluctuations of the room temperature above and below the predetermined point. If it is desired to close the valve 18 at a lower temperature than that for which the diaphragm 35 is adjusted, this may be accomplished manually by turning the wheel 55 and the stem 56 in one direction. If the thermostatically controlled elements are disconnected from the valve 18, the spring 61 will actuate the valve 18 to open position when the wheel 55 and the stem 56 are turned in the opposite direction.

The above described apparatus may be calibrated and adjusted in the following manner. Of course, it is understood that by suitable tests, the character and the amount of volatile fluid required by each of the diaphragms 35 and 43 may be readily ascertained and that after the apparatus has been assembled it may be tested and subjected to known temperatures. The dial 65 or the pointer 66 may be adjusted relative to each other or positioned relative to each other in such manner that when the diaphragms 35 and 43 function to seat the valve disc 19, the pointer will indicate the correct known temperature. Of course, the apparatus may also be calibrated by manipulating the screw 59. After that, the apparatus may be adjusted at any time by rotating the rod 36 until the pointer 66 registers with the temperature at which it is desired the diaphragms 35 and 43 will cause the valve disc 19 to seat.

The improved valve may also be adjusted with respect to the particular conditions under which it is to operate. Thus, the screw 51b may be manipulated to raise or lower the lever 51 and it is readily understood that if the lever is displaced upwards, the diaphragm 43 may be tensioned and the fully opened position of the valve disc 59 may be determined. In practice, I have found it advantageous to tension the diaphragm 43 in this manner when the valve is to be employed in a system which is designed to operate at a relatively high vacuum most of the time. This prevents the valve disc 19 from being forced down upon its seat 17 because of the vacuum obtaining in the system. Obviously, if the valve disc 19 were seated in this manner before the diaphragms 35 and 43 had functioned to seat it, insufficient heating fluid would be supplied to the radiator. When the improved valve is to be employed in a system wherein heating fluid is supplied at more than atmospheric pressure, the diaphragm 43 is not tensioned in the manner described above.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described the combination of a valve for controlling flow of a heating medium through said valve, said valve having an extension adapted to surround a pipe connected to the valve, a chambered member, means forming a connection and passage between said extension and said chambered member, a valve controlling said connection, temperature responsive means for controlling said valves, said temperature responsive means including means responsive to temperatures of a fluid body contained in a space in which said temperature responsive means is located and a fluid body of an increased temperature contained in said extension.

2. In a device of the kind described, the combination of a valve body having a valve therein, temperature responsive means carried by the valve body for actuating said valve, a tubular element extending from said body adapted to surround an end of a pipe which communicates with the valve body, said tubular element having a passage providing means for directing air to said temperature responsive means, a valve controlling said passage, and temperature responsive means for controlling said last mentioned valve.

3. In a device of the kind described, the combination of a valve body having a valve therein, temperature responsive means carried by said valve body for actuating said valve, a tubular element extending from said body adapted to surround an end of a pipe which communicates with the valve body, said tubular element having a passage extending therefrom providing means for directing air to said temperature responsive means, a valve controlling said passage and temperature responsive means for controlling said last mentioned valve, said last mentioned temperature responsive means being carried by said valve body, and said means and passage being disposed relatively to each other to allow circulation of air through said passage without affecting said means.

In witness whereof, I hereunto subscribe my name this 16th day of April A. D., 1929.

ROBERT H. CARSON.